United States Patent
Choi et al.

(10) Patent No.: US 9,924,541 B2
(45) Date of Patent: Mar. 20, 2018

(54) METHOD AND APPARATUS FOR TRANSMITTING FRAME IN WIRELESS LAN

(71) Applicant: LG ELECTRONICS INC., Seoul (KR)

(72) Inventors: Jinsoo Choi, Seoul (KR); Jinyoung Chun, Seoul (KR); Wookbong Lee, Seoul (KR); Dongguk Lim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 2 days.

(21) Appl. No.: 15/125,074

(22) PCT Filed: Jan. 21, 2015

(86) PCT No.: PCT/KR2015/000634
§ 371 (c)(1),
(2) Date: Sep. 9, 2016

(87) PCT Pub. No.: WO2015/137618
PCT Pub. Date: Sep. 17, 2015

(65) Prior Publication Data
US 2017/0027001 A1    Jan. 26, 2017

Related U.S. Application Data

(60) Provisional application No. 61/950,843, filed on Mar. 11, 2014.

(51) Int. Cl.
*H04W 74/08*     (2009.01)
*H04W 88/08*     (2009.01)
(Continued)

(52) U.S. Cl.
CPC ........ *H04W 74/0816* (2013.01); *H04H 20/12* (2013.01); *H04L 27/2628* (2013.01);
(Continued)

(58) Field of Classification Search
None
See application file for complete search history.

(56) References Cited

U.S. PATENT DOCUMENTS

2007/0060155 A1    3/2007   Kahana et al.
2009/0086706 A1*   4/2009   Huang ................ H04L 1/0026
                                                     370/349

(Continued)

*Primary Examiner* — Duc T Duong
(74) *Attorney, Agent, or Firm* — Lee, Hong, Degerman, Kang & Waimey PC

(57) ABSTRACT

Disclosed are a method and an apparatus for transmitting a frame in a wireless LAN. The method for transmitting a frame in a wireless LAN may comprise: a step in which an AP transmits an RTS frame for protecting a medium to an STA; a step in which the AP receives a CTS frame from the STA in response to the RTS frame; and a step in which the AP transmits a data frame to the STA in response to the CTS frame, wherein the RTS frame is included in a first PPDU which is generated on the basis of a first IFFT size, the data frame is included in a second PPDU which is generated on the basis of a second IFFT size, the second IFFT size is greater than the first IFFT size, and the data frame can be transmitted on the basis of a transmission-range-determining parameter which is determined on the basis of the difference between the second IFFT size and the first IFFT size.

10 Claims, 10 Drawing Sheets

(51) Int. Cl.
    *H04W 84/12*     (2009.01)
    *H04H 20/12*     (2008.01)
    *H04L 27/26*     (2006.01)
    *H04L 12/26*     (2006.01)
    *H04W 52/30*     (2009.01)
    *H04L 29/08*     (2006.01)

(52) U.S. Cl.
    CPC ............ *H04L 43/16* (2013.01); *H04W 52/30* (2013.01); *H04L 69/323* (2013.01); *H04W 84/12* (2013.01)

(56) References Cited

U.S. PATENT DOCUMENTS

| | | |
|---|---|---|
| 2011/0033012 A1 | 2/2011 | Matsuoka et al. |
| 2011/0110449 A1* | 5/2011 | Ramprashad ......... H04L 1/0003 375/261 |
| 2012/0230448 A1* | 9/2012 | Kang ................ H03M 13/6527 375/295 |
| 2012/0314695 A1 | 12/2012 | Liu |
| 2013/0017794 A1 | 1/2013 | Kloper et al. |
| 2013/0107912 A1 | 5/2013 | Ponnampalam |
| 2014/0153507 A1* | 6/2014 | Yang ................... H04L 27/2602 370/329 |
| 2017/0231009 A1* | 8/2017 | Wang ................ H04W 74/0816 |

* cited by examiner

FIG. 1
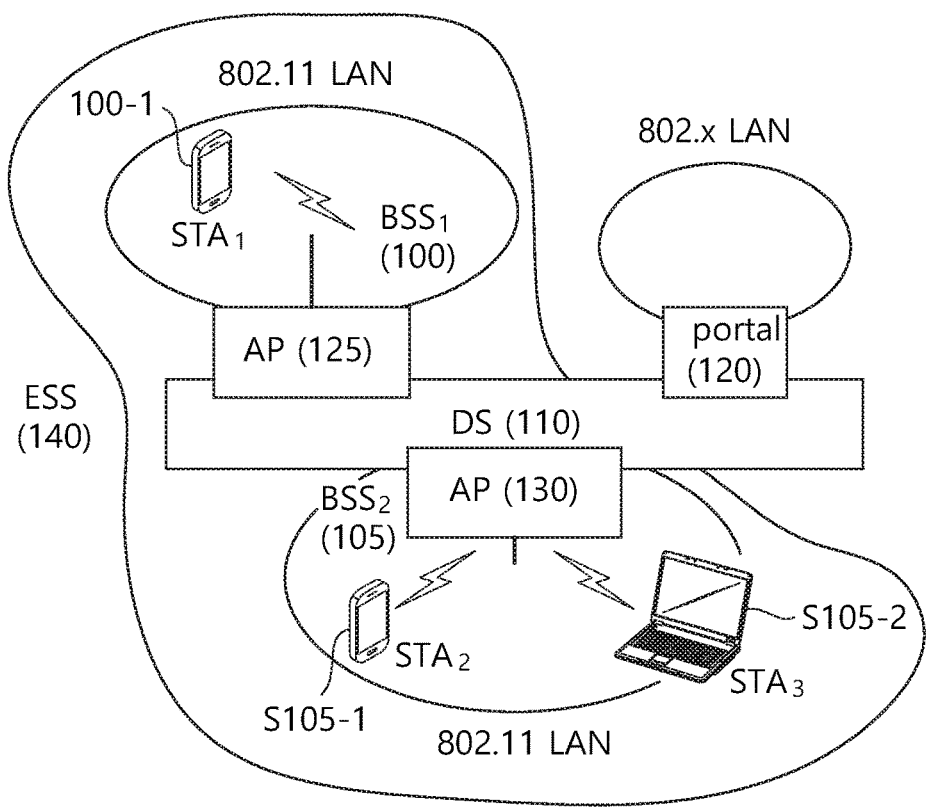
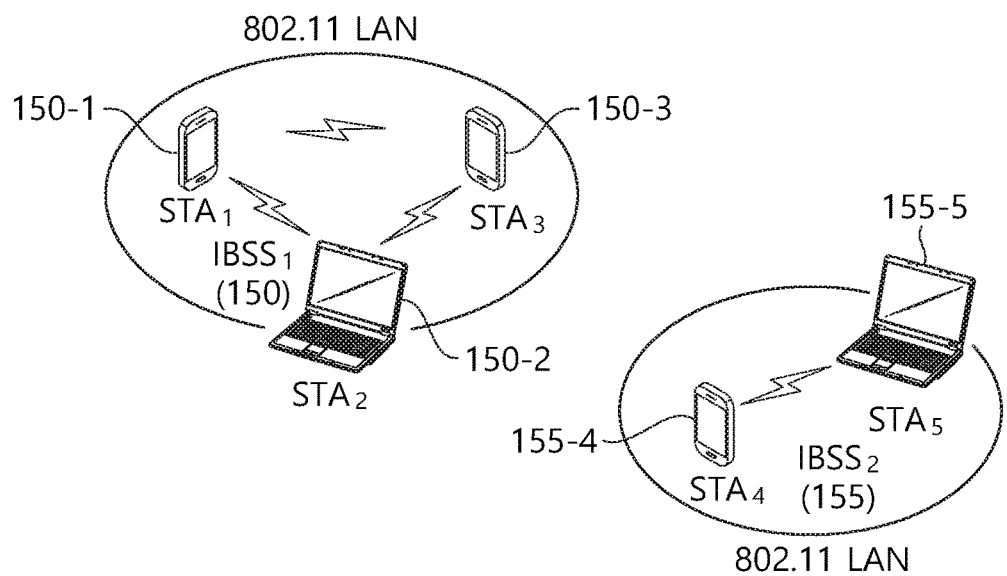

METHOD AND APPARATUS FOR TRANSMITTING FRAME IN WIRELESS LAN

CROSS-REFERENCE TO RELATED APPLICATIONS

This application is the National Stage filing under 35 U.S.C. 371 of International Application No. PCT/KR2015/000634, filed on Jan. 21, 2015, which claims the benefit of U.S. Provisional Application No. 61/950,843, filed on Mar. 11, 2014, the contents of which are all hereby incorporated by reference herein in their entirety.

BACKGROUND OF THE INVENTION

Field of the Invention

The present invention relates to wireless communications, and more particularly, to a method and an apparatus for transmitting a frame a wireless local area network (WLAN).

Related Art

A wide range of bandwidths from 20 MHz to 160 MHz become available for the existing wireless local area network (WLAN) system. Accordingly, choosing an appropriate channel bandwidth for communications between a transmitting terminal (station (STA)) and a receiving terminal is a determining factor for the performance of the WLAN system.

To choose an appropriate channel bandwidth for communications between transmitting and receiving terminals, a dynamic channel bandwidth setting protocol based on a Request to Send (RTS) frame and a Clear to Send (CTS) frame has been developed for IEEE 802.11ac and subsequent standards. Initial RTS and CTS frames are designed to reduce a hidden node issue and data frame collision overheads. A transmitting terminal transmits an RTS frame to a receiving terminal before transmitting a data frame. The destination terminal, which has received the RTS frame, responds with a CTS frame to the transmitting terminal. Third terminals, which have received the RTS frame and the CTS frame, may delay medium access for a certain period of time in order to protect the data frame to be subsequently transmitted.

According to the dynamic channel bandwidth setting protocol supported by IEEE 802.11ac and subsequent standards, the transmitting terminal transmits the RTS frame via a wide band grater than a channel bandwidth of 20 MHz, and the destination terminal may respond with the CTS frame according to a channel bandwidth currently available for the destination terminal. For example, when the transmitting terminal wishes to use a 160 MHz channel bandwidth, the transmitting terminal transmits the RTS frame through the 160 MHz channel bandwidth. If an 80 MHz channel bandwidth is currently available for the destination terminal, the destination terminal transmits the CTS frame through the 80 MHz channel bandwidth. When the transmitting terminal, which has transmitted the RTS frame, receives the CTS frame through the 80 MHz channel bandwidth, the transmitting terminal needs to transmit a data frame, subsequently transmitted to the target terminal, through a channel bandwidth of 80 MHz or smaller.

SUMMARY OF THE INVENTION

An aspect of the present invention is to provide a method of transmitting a frame in a wireless local area network (WLAN).

Another aspect of the present invention is to provide an apparatus that performs a method of transmitting a frame in a WLAN.

To achieve the aforementioned purposes of the present invention, a method of transmitting a frame in a wireless local area network (WLAN) according to one aspect of the present invention may include: transmitting, by an access point (AP), a Request to Send (RTS) frame for medium protection to a station (STA); receiving, by the AP, a Clear to Send (CTS) frame from the STA in response to the RTS frame; and transmitting, by the AP, a data frame to the STA in response to the CTS frame, wherein the RTS frame may be included in a first physical layer convergence procedure (PLCP) protocol data unit (PPDU) that is generated on the basis of a first inverse fast Fourier transform (IFFT) size, the data frame may be included in a second PPDU that is generated on the basis of a second IFFT size, the second IFFT size may be greater than the first IFFT size, and the data frame may be transmitted on the basis of a transmission range determination parameter that is determined on the basis of a difference between the second IFFT size and the first IFFT size.

To achieve the aforementioned purposes of the present invention, an AP for transmitting a frame in a WLAN according to another aspect of the present invention may include a radio frequency (RF) unit configured to transmit or receive a radio signal; and a processor operatively connected to the RF unit, wherein the processor may be configured to transmit an RTS frame for medium protection to an STA, to receive a CTS frame from the STA in response to the RTS frame, and to transmit a data frame to the STA in response to the CTS frame, the RTS frame may be included in a first PPDU that is generated on the basis of a first IFFT size, the data frame may be included in a second PPDU that is generated on the basis of a second IFFT size, the second IFFT size may be greater than the first IFFT size, and the data frame may be transmitted on the basis of a transmission range determination parameter that is determined on the basis of a difference between the second IFFT size and the first IFFT size.

Transmission ranges of frames are synchronized to reduce a collision between the frames in a WLAN system.

BRIEF DESCRIPTION OF THE DRAWINGS

FIG. 1 is a conceptual view illustrating a structure of a wireless local area network (WLAN).

DESCRIPTION OF EXEMPLARY EMBODIMENTS

FIG. 1 is a conceptual view illustrating a structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a conceptual view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.).

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
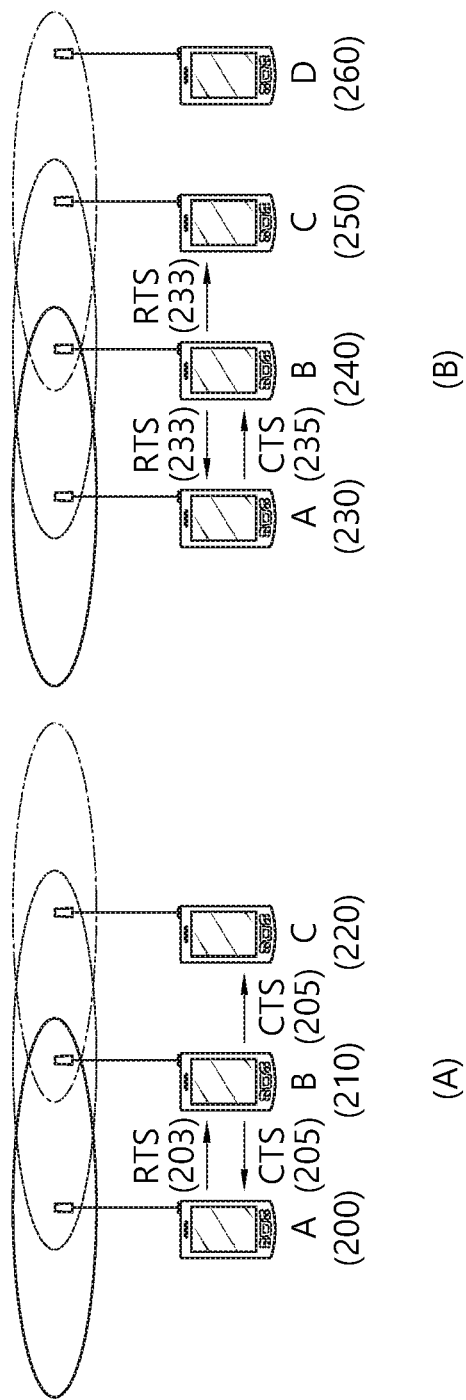
FIG. 2 is a conceptual view illustrating a method of using a Request to Send (RTS) frame and a Clear to Send (CTS) frame in order to resolve a hidden node issue and an exposed node issue.

FIG. 2 is a conceptual view illustrating a method of using a Request to Send (RTS) frame and a Clear to Send (CTS) frame in order to resolve a hidden node issue and an exposed node issue.

Referring to FIG. 2, a short signaling frame, such as an RTS frame and a CTS frame, may be used to solve the hidden node issue and the exposed node issue. Neighboring STAs may recognize based on the RTS frame and the CTS frame whether data transmission and reception is performed between two STAs.

(A) of FIG. 2 illustrates a method of transmitting an RTS frame 203 and a CTS frame 205 in order to solve the hidden node issue.

It may be assumed that both STA A 200 and STA C 220 intend to transmit data frames to STA B 210. STA A 200 transmits an RTS frame 203 to STA B 210 before transmitting a data frame, and STA B 210 may transmit a CTS frame 205 to STA A 200. STA C 220 overhears the CTS frame 205 and recognizes that transmission of a frame is performed via a medium from STA A 200 to STA B 210. STA C 220 may set a network allocation vector (NAV) until STA A 200 finishes transmitting the data frame to STA B 210. Using such a method may prevent a collision between frames due to a hidden node.

(B) of FIG. 2 illustrates a method of transmitting an RTS frame 233 and a CTS frame 235 in order to solve the exposed node issue STA C 250 may determine whether a collision occurs if transmitting a frame to another STA D 260 based on monitoring of an RTS frame 233 and a CTS frame 235 between STA A 230 and STAB 240.

STA B 240 transmits the RTS frame 233 to STA A 230, and STA A 230 may transmit the CTS frame 235 to STA B 240. STA C 250 overhears only the RTS frame 233 transmitted by STA B 240 and does not overhear the CTS frame 235 transmitted by STA A 230. Thus, STA C 250 recognizes that STA A 230 is out of a carrier sensing range of STA C 250. Accordingly, STA C 250 may transmit data to STA D 260.

An RTS frame format and a CTS frame format are disclosed in 8.3.1.2 RTS frame format and 8.3.1.3 CTS frame format of IEEE P802.11-REVmcTM/D2.0, October 2013.

There are growing demands for improved throughput and quality of experience (QoE) as compared with those of the existing WLAN system (legacy WLAN system) and the introduction of a new frame (or physical layer convergence procedure (PLCP) protocol data unit (PPDU)) format for a new WLAN system is under discussion. When the new frame (PPDU) format is introduced, the new frame (PPDU) format may coexist with a legacy frame (PPDU) format for a legacy STA operating in the existing legacy WLAN system.

The legacy STA does not recognize operability and features of the new WLAN system. Thus, the new WLAN system needs to be designed not to cause any impact or minimum impact on the performance of the legacy STA. However, it is not proper that advantages of the new WLAN system are unnecessarily reduced due to a consideration of the decrease in the performance of the legacy STA. Therefore, the new WLAN system needs to be designed considering the advantages of the new WLAN system and the decrease in the performance of the legacy WLAN system suitably in balance.

Figure 3:
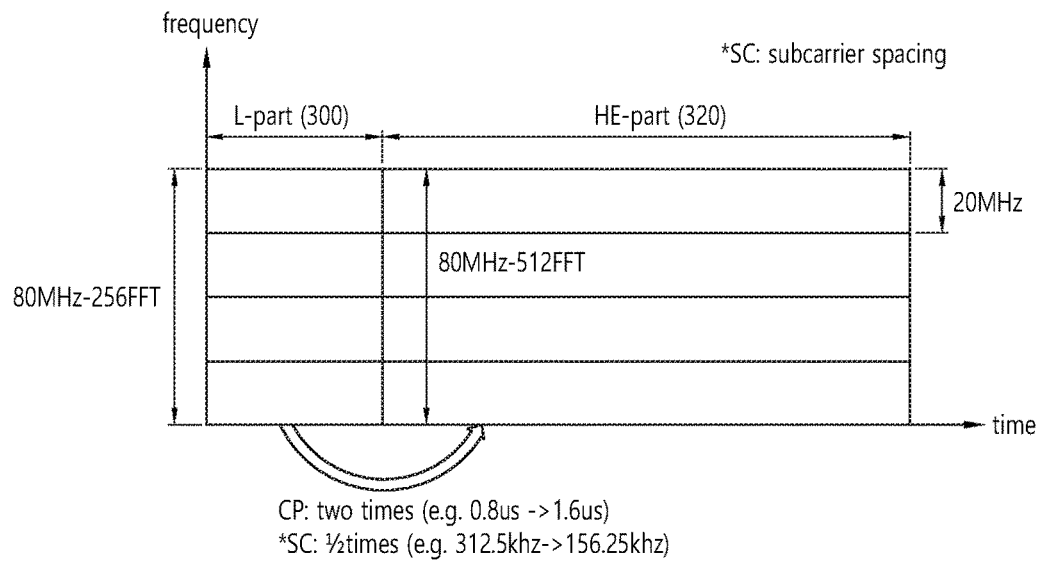
FIG. 3 is a conceptual view illustrating a method of generating a high-efficiency (HE) physical layer convergence procedure (PLCP) protocol data unit (PPDU) based on an increased inverse fast Fourier transform (IFFT) according to an embodiment of the present invention.

FIG. 3 is a conceptual view illustrating a method of generating a high-efficiency (HE) PPDU based on an increased inverse fast Fourier transform (IFFT) according to an embodiment of the present invention.

FIG. 3 illustrates an FFT/IFFT method for generating an HE PPDU.

An HE PPDU may be divided into a legacy part 300 to a legacy-signal (L-SIG) and an HE part 320 after the L-SIG for convenience. The legacy part 300 may include information for an operation of a legacy STA. The HE part 320 may include HE fields for supporting operations in a WLAN system, such as an HE-SIG, an HE-short training field (HE-STF), an HE-long training field (HE-LTF), and an HE-SIG2. These HE fields are examples of fields for interpreting the HE PPDU excluding the legacy part. The HE fields will be described later in detail.

As described above, to reduce an effect of large delay spread in the outdoor environment, a different IFFT option (or different IFFT size or increased IFFT size) from a legacy IFFT size applied to the legacy part may be used to generate the HE part 320. The HE part 320 may be generated based on an IFFT with a relatively larger size (increased IFFT size) than that for the legacy part 300 on the basis of the same bandwidth size. In this case, different numerologies (for example, guard interval (GI) sizes or IFFT sizes) may be used to generate the HE PPDU.

FIG. 3 illustrates that the increased IFFT size (for example, 512 IFFT) used for the HE part 320 in the HE PPDU is double the legacy IFFT size (for example, 256 IFFT) used for the legacy part 300.

When an IFFT size increases by two times, the number of subcarriers in the same bandwidth increases by two times and subcarrier spacing may decrease by ½ times. Further, the length of effective symbol duration may also increase by two times, and the length (or duration) of a GI may also increase by two times with the same GI portion (for example, ¼). One OFDM symbol may include an effective symbol and a GI. That is, the duration of one OFDM symbol, which is the entire symbol duration, may be the sum of effective symbol duration and GI duration.

Alternatively, when an IFFT size increases by four times, the number of subcarriers increases by four times, subcarrier spacing may decrease by ¼ times, and the length of effective symbol duration may increase by four times. With the same GI portion, the length of a GI may increase by four times.

When GI length becomes relatively long, impacts of inter-symbol interference (ISI) and inter-carrier interference (ICI) due to large delay spread may be relatively reduced. Thus, a transmission range of a PPDU (or a frame included in a PPDU) may increase according to an increase in GI length.

When a GI portion is reduced (for example, from ¼ to ¹⁄₁₆), the GI length may increase less than an IFFT size increase rate. In this case, radio resource utilization efficiency may increase.

An HE STA needs to be capable of decoding the legacy part 300 included in the PPDU, which is generated based on the legacy IFFT size, and the HE part 320, which is generated based on the increased IFFT size. However, a legacy STA is capable of decoding the legacy part 300 but may be incapable of decoding the HE part 320. In the following embodiments of the present invention, an HE STA may denote an STA that is capable of decoding the HE PPDU including the HE part 320 which is generated based on the increased IFFT size. A legacy STA may denote an STA that is capable of decoding the legacy part which is generated based on the legacy IFFT size but is incapable of decoding the HE part 320 which is generated based on the increased IFFT size. An HE AP may denote an AP that is capable of supporting both an HE STA and a legacy STA.

Further, in the following embodiments of the present invention, an HE PPDU may denote a PPDU that is generated based on an increased IFFT (or a legacy IFFT and an increased IFFT), and a legacy PPDU may denote a PPDU that is generated based on only a legacy IFFT. Further, a frame (for example, a data frame) carried through an HE PPDU may be referred to as an HE frame, and a frame carried through a legacy PPDU may be referred to as a legacy frame (for example, an RTS frame and a CTS frame).

The HE PPDU illustrated in FIG. 3 may be used for transmission or reception of a data frame (or management frame) between an HE STA and an HE AP.

An RTS frame and a CTS frame may need to be detected and decoded not only by an HE STA but also by a legacy STA. Thus, the formats of the RTS frame and the CTS frame (an RTS PPDU carrying the RTS frame and a CTS PPDU carrying the CTS frame) may need to be maintained to be the format of a legacy frame (or legacy PPDU). Thus, the RTS frame and the CTS frame may be transmitted via the legacy PPDU.

Due to a difference in IFFT size, a transmission range of a data PPDU (or data frame) may be different from a transmission range of an RTS PPDU (RTS frame)/CTS PPDU (CTS frame). A non-target STA located in the transmission range of the RTS frame and the CTS frame may receive the RTS frame and the CTS frame and may set a network allocation vector (NAV). The non-target STA may indicate an HE STA or legacy STA which is not a transmitter or receiver of the RTS frame or CTS frame. However, a non-target STA located outside the transmission range of the RTS frame and/or CTS frame may not receive the RTS frame and/or CTS frame. The non-target STA not receiving the RTS frame and/or CTS frame may perform channel access to transmit a frame to the AP during communication between the AP and a target STA. When the non-target STA transmits the frame, a collision may occur between a frame transmitted from the target STA to the AP (or frame transmitted from the AP to the target STA) and the frame transmitted by the non-target STA.

That is, due to a difference between the transmission range of the RTS frame/CTS frame and a transmission range of an HE frame carried through an HE PPDU generated based on an increased IFFT size, a collision between the frames may occur.

The following embodiments of the present invention illustrate a method for preventing a collision between frames in a BSS by reducing a difference between a transmission range of an RTS frame/CTS frame carried through a legacy PPDU and a transmission range of a frame (for example, a data frame) carried through an HE PPDU. A method of reducing the difference between the transmission range of the RTS frame/CTS frame and the transmission range of the HE frame carried through the PPDU generated based on the increased IFFT size may be referred to as a transmission range synchronization method.

In the following description, it is assumed that the frame carried through the HE PPDU generated based on the increased IFFT size is a data frame.

Figure 4:
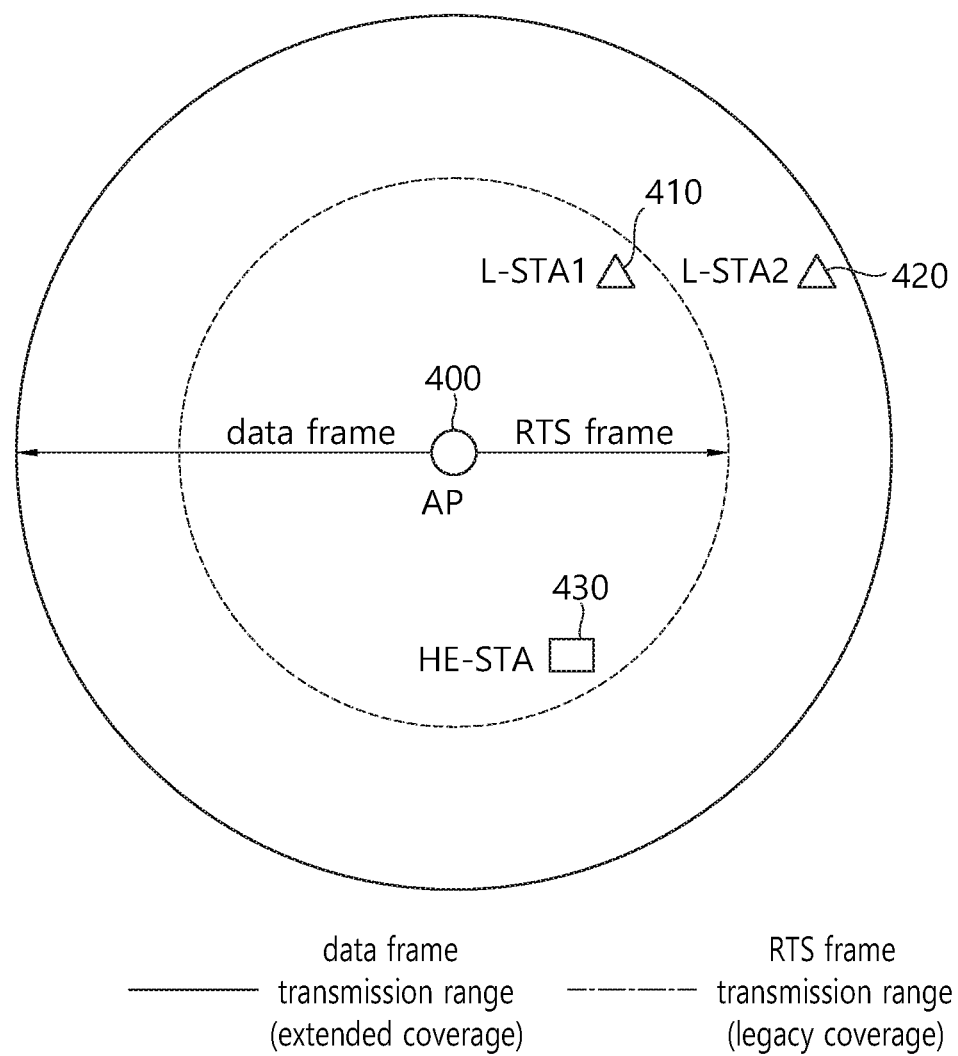
FIG. 4 is a conceptual view illustrating a collision between frames caused by a difference between a transmission range of a legacy frame and a transmission range of an HE frame.

FIG. 4 is a conceptual view illustrating a collision between frames caused by a difference between a transmission range of a legacy frame and a transmission range of an HE frame.

FIG. 4 illustrates a collision between frames that occurs in a BSS due to a difference between a transmission range of an RTS frame/CTS frame and a transmission range of a data frame. It is assumed that the RTS frame/CTS frame is carried via a legacy PPDU and the data frame is carried via an HE PPDU.

Referring to FIG. 4, an HE AP 400 may support L-STA1 410 and L-STA2 420, which are legacy STAs capable of decoding a legacy PPDU. Further, the HE AP 400 may also support an HE-STA 430, which is an STA capable of decoding an HE PPDU.

From the HE AP 400, a transmission range of a legacy frame (for example, an RTS frame and a CTS frame) of the HE AP 400 may be referred to as legacy coverage, and a transmission range of an HE frame (for example, a data frame) may be referred to as extended coverage. For example, the legacy coverage may be the transmission range of the legacy frame carried through a legacy PPDU generated based on a 64 IFFT, and the extended coverage may be the transmission range of the HE frame carried through an HE PPDU generated based on a 126 IFFT.

L-STA1 410 may be located in the legacy coverage, while L-STA2 420 and the HE STA 430 may be located in the extended coverage.

The HE AP 400 may transmit an RTS frame for communication with the HE-STA 430. The RTS frame may be transmitted within the legacy coverage. The HE-STA 430 may be located within the legacy coverage and thus may transmit a CTS frame to the AP in response to the RTS frame transmitted by the HE-AP 400.

L-STA1 410 located in the legacy coverage may detect the RTS frame transmitted by the HE AP 400. Thus, L-SAT1 410 may receive the RTS frame, may set an NAV, and may not attempt channel access in a transmission interval of a data frame from the AP 400 to the HE-STA 430. L-STA1 410 located in the legacy coverage does not cause a collision between frames in the WLAN system.

L-STA2 420 may be located within the extended coverage out of the legacy coverage. L-STA2 420 may not receive the RTS frame transmitted by the HE AP 400 and may not set an NAV based on the RTS frame. Further, L-STA2 420 may not receive the CTS frame transmitted by the HE-STA 430. In this case, L-STA2 420 may perform channel access to transmit a frame in an interval for communication between the HE AP 400 and the HE-STA 430, causing a collision between frames in the BSS. Specifically, a collision may occur between the data frame transmitted from the AP 400 to the HE-STA 430 and a data frame transmitted from L-STA2 420 to the HE AP 400.

In the interval for communication between the HE AP 400 and the HE-STA 430, not only L-STA2 420 but also another non-target STA (for example, another HE STA) may transmit a frame to cause a collision between frames in the BSS. The non-target STA may be a hidden STA from the HE AP 400 or target STA (HE-STA 430).

To prevent a collision between frames caused by a difference between the transmission range of the legacy frame and the transmission range of the HE frame, there may be used a modulation and coding scheme (MCS)-based transmission range synchronization method, a clear channel assessment (CCA)-based transmission range synchronization method, and a transmit power-based transmission range synchronization method.

Figure 5:
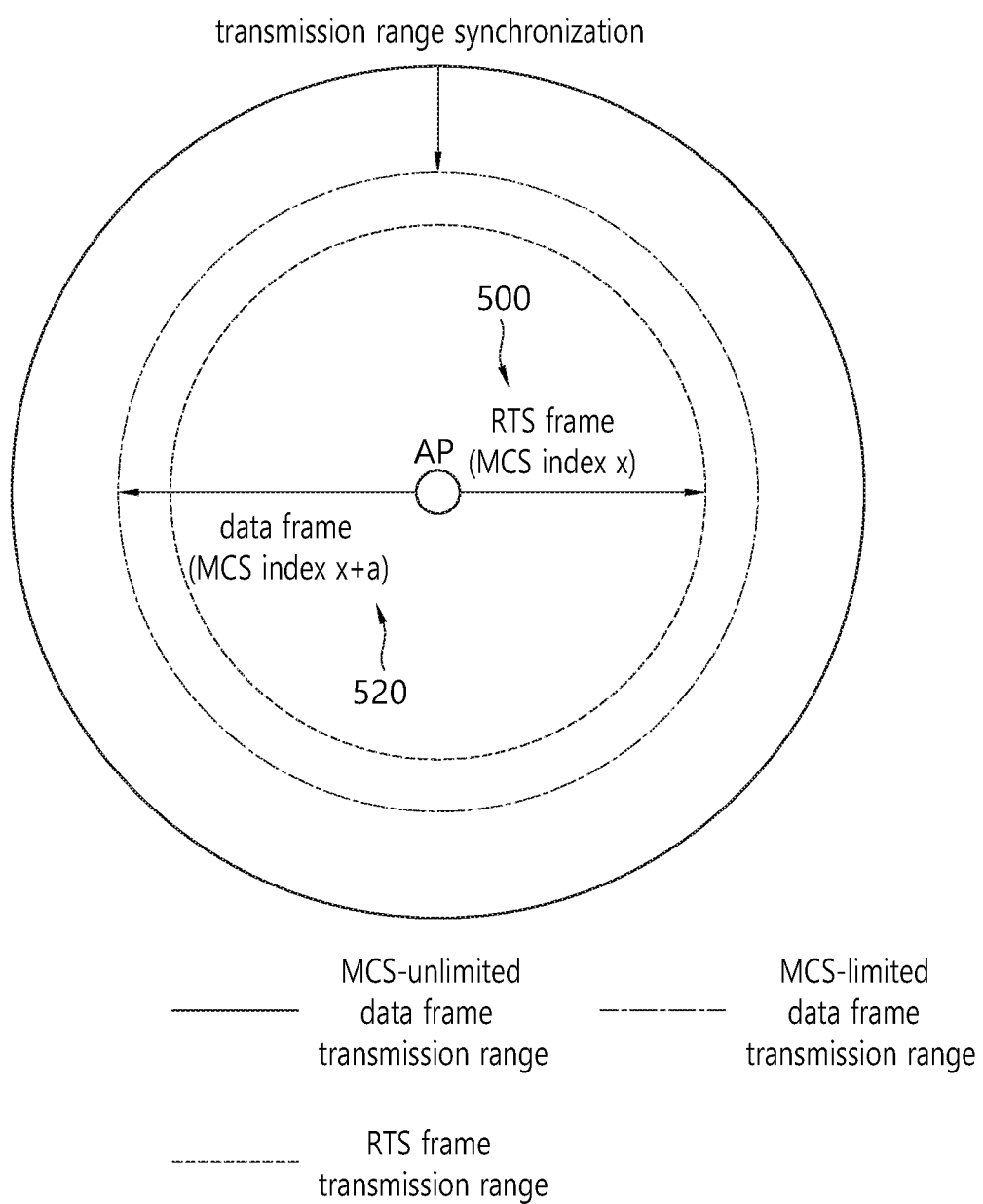
FIG. 5 is a conceptual view illustrating a modulation and coding scheme (MCS)-based transmission range synchronization method according to an embodiment of the present invention.

FIG. 5 is a conceptual view illustrating an MCS-based transmission range synchronization method according to an embodiment of the present invention.

FIG. 5 illustrates a method of synchronizing transmission ranges of a legacy frame (for example, an RTS frame) and an HE frame (for example, a data frame) based on an MCS index of a legacy PPDU (or legacy frame) and an MCS index of an HE PPDU (or HE frame). With a relatively lower MCS index, a modulation method and coding rate which are relatively more robust to an error may be used. With a relatively higher MCS index, a modulation method and coding rate which are relatively vulnerable to an error may be used. Table 1 below illustrates modulation methods and coding rates according to MCS indexes.

TABLE 1

| MCS index (normal) | Modulation & coding rate (or transmit block size) |
|---|---|
| 0 | BPSK 1/2 |
| 1 | QPSK 1/2 |
| 2 | QPSK 3/4 |
| 3 | 16-QAM 1/2 |
| 4 | 16-QAM 3/4 |
| 5 | 64-QAM 2/3 |
| 6 | 64-QAM 3/4 |
| 7 | 64-QAM 5/6 |
| 8 | 256-QAM 3/4 |
| 9 | 256-QAM 5/6 |

Referring to FIG. 5, an MCS index for transmitting an RTS frame 500 may be set to be different from an MCS index for transmitting a data frame 520, thereby synchronizing transmission ranges.

Hereinafter, the MCS index of the RTS frame 500 may be referred to as an RTS MCS index, and the MCS index of the data frame 520 may be referred to as a data MCS index.

The RTS MCS index may be set to have a relatively smaller value than the data MCS index. When the RTS MCS index is set to have a relatively smaller value than the data MCS index, the RTS frame 500 may be relatively more robust to an error than the data frame 520. When the RTS frame 500 is relatively more robust to an error than the data frame 520, the transmission range of the RTS frame 500 may become relatively wide (large), considering only the MCS index, without considering an IFFT size, on the basis of the transmission range of the data frame 520. The data frame 520 transmitted through the HE PPDU may have a relatively wider transmission range than the RTS frame 500 transmitted through the legacy PPDU. However, when the data MCS index is greater than the RTS MCS index, the possible transmission range may be reduced.

That is, the possible transmission range of the data frame 520 is reduced based on restriction of the data MCS index used for transmission of the data frame 520, thereby synchronizing the transmission range of the RTS frame 500 and the transmission range of the data frame 520. The transmission range of the data frame 520 reduced based on the restriction of the MCS index may be an MCS restricted data frame transmission range.

According to the embodiment of the present invention, a difference between the data MCS index and the RTS MCS index may be determined based on a difference between the transmission range of the data frame 520 from an HE AP and the transmission range of the RTS frame 500 from the HE AP. When the difference between the transmission ranges is x (dB), the difference between the data MCS index and the RTS MCS index may correspond to x (dB). The difference between the transmission ranges may be expressed in various units. For convenience of description, a unit for expressing the difference between the transmission ranges is omitted herein.

Hereinafter, a transmission range difference may refer to the difference between the transmission range of the data frame 520 from the HE AP and the transmission range of the RTS frame 500 from the HE AP, and an MCS index difference may refer to the difference between the data MCS index and the RTS MCS index.

The transmission range difference may be a parameter determined based on an increase in IFFT size. For example, when an increased IFFT size is twice larger than a legacy IFFT size, the transmission range difference may be 3 (dB). When the increased IFFT size is four times larger than the legacy IFFT size, the transmission range difference may be 6 (dB). The transmission range difference may adaptively change according to a parameter further considering an environment of a WLAN system.

The MCS index difference may be determined corresponding to the transmission range difference. For example, a transmission range difference of 3 (dB) may correspond to an MCS index difference of 2. That is, when the difference between the transmission range of the data frame 520 from the HE AP and the transmission range of the RTS frame 500 from the HE AP is 3 (dB), the data MCS index may be two greater than the RTS MCS index. Specifically, when the data MCS index is determined to be 2, the RTS MCS index may be determined to be 0.

For example, the AP may use a first MCS index, which is determined based on feedback information actually received from an STA, to transmit the RTS frame 500. Further, the AP may use a second MCS index, which is increased from the first MCS index further considering a transmission range difference, to transmit the data frame 520. The second MCS index may be determined by adding the first MCS index and an MCS index difference determined based on a transmission range difference.

Some MCS indexes are unavailable for transmission of the data frame 520 depending on a transmission range difference. Table 2 below illustrates MCS indexes available for transmission of the data frame 520.

TABLE 2

| MCS index (normal) | MCS index (with RTS protection) | Modulation & coding rate (or transmit block size) |
|---|---|---|
| 0 | Not available | BPSK 1/2 |
| 1 | Not available | QPSK 1/2 |
| 2 | Available | QPSK 3/4 |
| 3 | Available | 16-QAM 1/2 |
| 4 | Available | 16-QAM 3/4 |
| 5 | Available | 64-QAM 2/3 |
| 6 | Available | 64-QAM 3/4 |
| 7 | Available | 64-QAM 5/6 |
| 8 | Available | 256-QAM 3/4 |
| 9 | Available | 256-QAM 5/6 |

Table 2 illustrates an MCS index difference of 2 according to a transmission range difference. When the data MCS index is 0 or 1, it is impossible that the data MCS index is greater than the RTS MCS index. Thus, it is avoided to use a data MCS index of 0 or 1.

Table 2 is a table of MCS indexes according to specific transmission range differences. A transmission range difference may change according to an increased IFFT size. Thus, an MCS index that is unavailable as a data MCS index may change according to an increased IFFT size (125 IFFT, 256 IFFT, 512 IFFT, or 1024 IFFT). That is, a table of MCS indexes available for transmission of the data frame 520 may change according to an increased IFFT size.

The transmission range of the data frame 520 may be partly reduced, while data rate may increase due to use of a high MCS. According to the embodiment of the present invention, the AP may use the MCS-based transmission range synchronization method illustrated in FIG. 5 only for some STAs, to which the data frame 520 is transmitted not necessarily based on a low MCS index (for example, MCS index 0 and MCS index 1), among STAs in the BSS. For example, the AP may use the MCS-based transmission range synchronization method when transmitting the data frame 520 to STAs located at the center of the BSS or having a sufficient margin for signal-to-noise ratio (SNR) rather than STAs needing a low MCS which are located on the edge of the BSS. In the WLAN system, one or more different MCS tables may be used to support STAs operating in different environments.

The same MCS index as for the RTS frame 500 may be used to transmit a CTS frame as well as in transmission of the RTS frame 500. An HE STA, which has received the RTS frame, may transmit a CTS frame generated using the same MCS index as the MCS index used for transmission of the RTS frame 500. For example, an MCS index of 0 may be used for transmission of the RTS frame 500 and the CTS frame, and an MCS index of 2 may be used for transmission of the data frame 520. Further, the MCS-based transmission range synchronization method may also be used to transmit another legacy frame (or legacy PPDU) and another HE frame (HE PPDU) as well as the RTS frame 500, the CTS frame, and the data frame 520.

When a frame is successfully transmitted in the existing WLAN system, a following frame among a plurality of frames transmitted or received within one transmission opportunity (TXOP) is transmitted based on an MCS index that is the same as or relatively lower than that used for transmission of a preceding frame. In the MCS-based transmission range synchronization method according to the embodiment of the present invention, the MCS index of the data frame 520, which is transmitted after transmission and reception of the RTS frame and the CTS frame, may have a greater value than the MCS index of the RTS frame 500 and the CTS frame, which may be determined further considering a transmission range difference.

Figure 6:
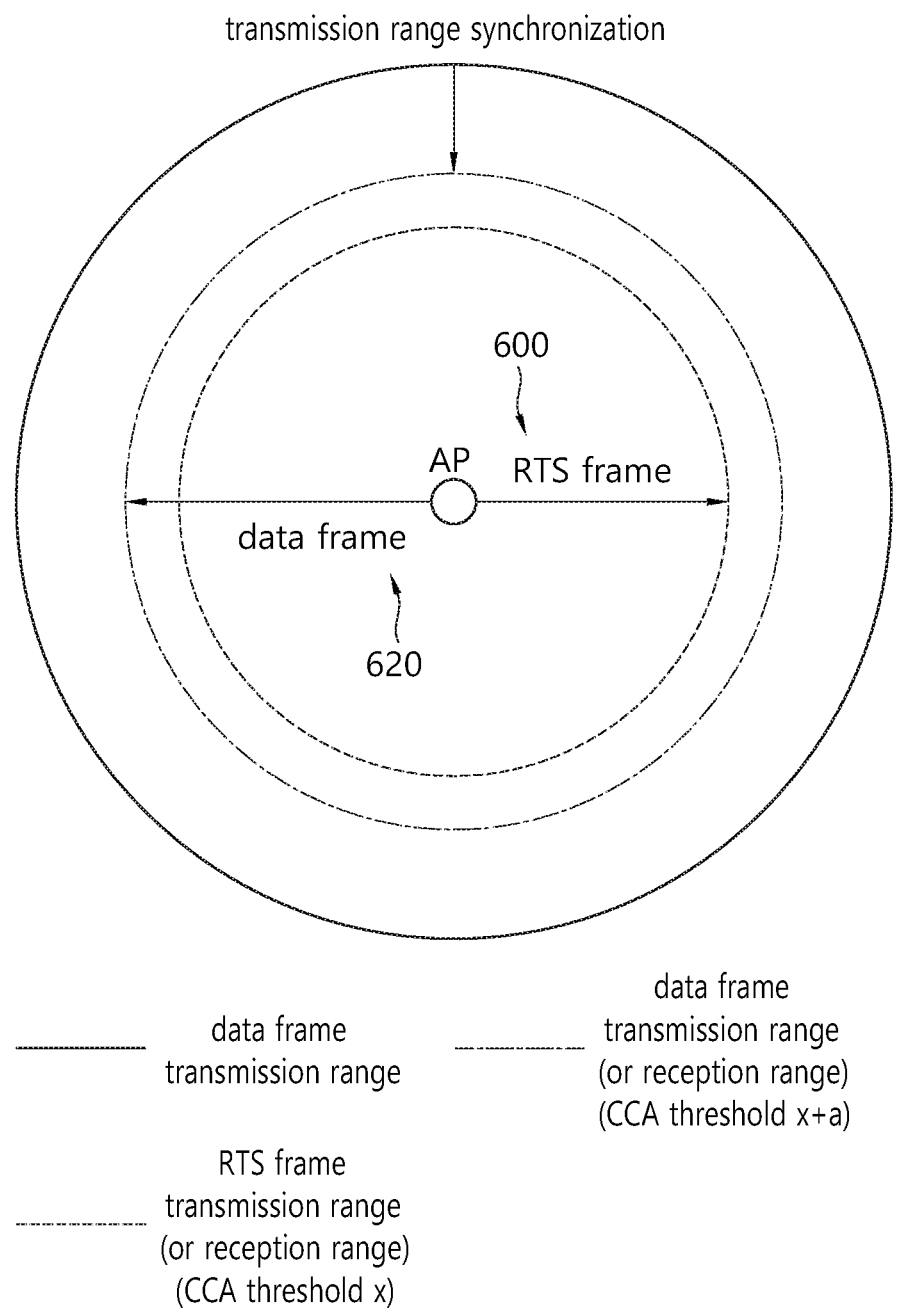
FIG. 6 is a conceptual view illustrating a clear channel assessment (CCA)-based transmission range synchronization method according to an embodiment of the present invention.

FIG. 6 is a conceptual view illustrating a CCA threshold-based transmission range synchronization method according to an embodiment of the present invention.

FIG. 6 illustrates a method of synchronizing transmission ranges of an RTS frame 600 and a CTS frame as legacy frames and a transmission range of a data frame 620 as an HE frame by setting a CCA threshold for receiving a legacy PPDU (or legacy frame) to be different from a CCA threshold for receiving an HE PPDU (or HE frame). A CCA threshold may be a minimum receiver sensitivity level defined in a WLAN system. When a frame transmitted with a strength equal to or greater than a CCA threshold is sensed on a medium, an STA may determine that the medium is busy and may not perform channel access even though the STA has a frame to receive (to decode) or has a pending frame. On the contrary, when a signal with a strength lower than the CCA threshold is sensed on the medium, the STA, which does not receive (decode) a frame or has a pending frame, may determine that the medium is idle and may perform channel access.

When the CCA threshold becomes relatively high, the sensing sensitivity of the STA relatively decreases and only a frame transmitted with a relatively high strength may be detected by the STA. That is, when the CCA threshold of the receiving STA becomes relatively high, a frame transmission range (or coverage) of an AP (or a frame reception range of the STA) may decrease (or become narrow).

When the CCA threshold becomes relatively low, the sensing sensitivity of the STA relatively increases and even a frame transmitted with a relatively low strength may be detected by the STA. That is, when the CCA threshold of the receiving STA becomes relatively low, the frame transmission range (or coverage) of the AP (or the frame reception range of the STA) may increase (or become wide).

Referring to FIG. 6, when a CCA threshold for the receiving STA to receive the RTS frame 600 (or legacy frame) is determined (set) to be −82 dBm, a CCA threshold for the receiving STA to receive the data frame (or HE frame) may be determined (set) to be a value greater than −82 dBm (for example, −79 dBm). In this case, if considering only the CCA thresholds, the transmission range of the data frame 620 may be relatively smaller than the transmission range of the RTS frame due to the CCA threshold of the receiving STA.

Hereinafter, the CCA threshold for the RTS frame 600 may be referred to as an RTS CCA threshold, and the CCA threshold for the data frame 620 may be referred to as a data CCA threshold.

The data CCA threshold and the RTS CCA threshold of the receiving STA may be set based on a transmission range difference based on an IFFT size difference. For example, when a transmission range difference is 3 (dB), the data CCA threshold may be set to be 3 (dB) greater than the RTS CCA value. Specifically, when the RTS CCA threshold is set to be −82 dBm, the data CCA threshold may be set to be −82 dBm+3 (dB)=−79 dBm. Alternatively, when the data CCA threshold is set to be −82 dBm, the RTS CCA threshold may be set to be −85 dBm. When a transmission range difference changes according to a difference between a legacy IFFT size and an increased IFFT size, a difference between the RTS CCA threshold and the data CCA threshold may also change.

The CCA threshold for the RTS frame 600 may be determined so as not to affect RTS frame detecting performance of a legacy STA.

When the data CCA threshold increases, the transmission range (reception range) of the data frame 620 transmitted by the AP may partly decrease. However, when the data CCA threshold increases, a transmission opportunity for the receiving STA may relatively increase. Specifically, when the data CCA threshold increases, the medium sensing sensitivity of the receiving STA is decreased so that the STA may consider that a medium is relatively idle in an increasing time interval. Thus, when the data CCA threshold increases, the transmission opportunity for the receiving STA may relatively increase.

A CCA threshold for the CTS frame as well as for the RTS frame 600 may be set to be equal to the RTS CCS threshold. Further, a transmission range difference may change according to an increased IFFT size (125 IFFT, 256 IFFT, 512 IFFT, or 1024 IFFT), and a CCA value difference (a difference between the data CCA threshold and the RTS CCA threshold) may change according to a transmission range difference. A CCA value difference is defined according to an increased IFFT size in the WLAN system and may be used to set a CCA threshold for an STA in the BSS.

Figure 7:
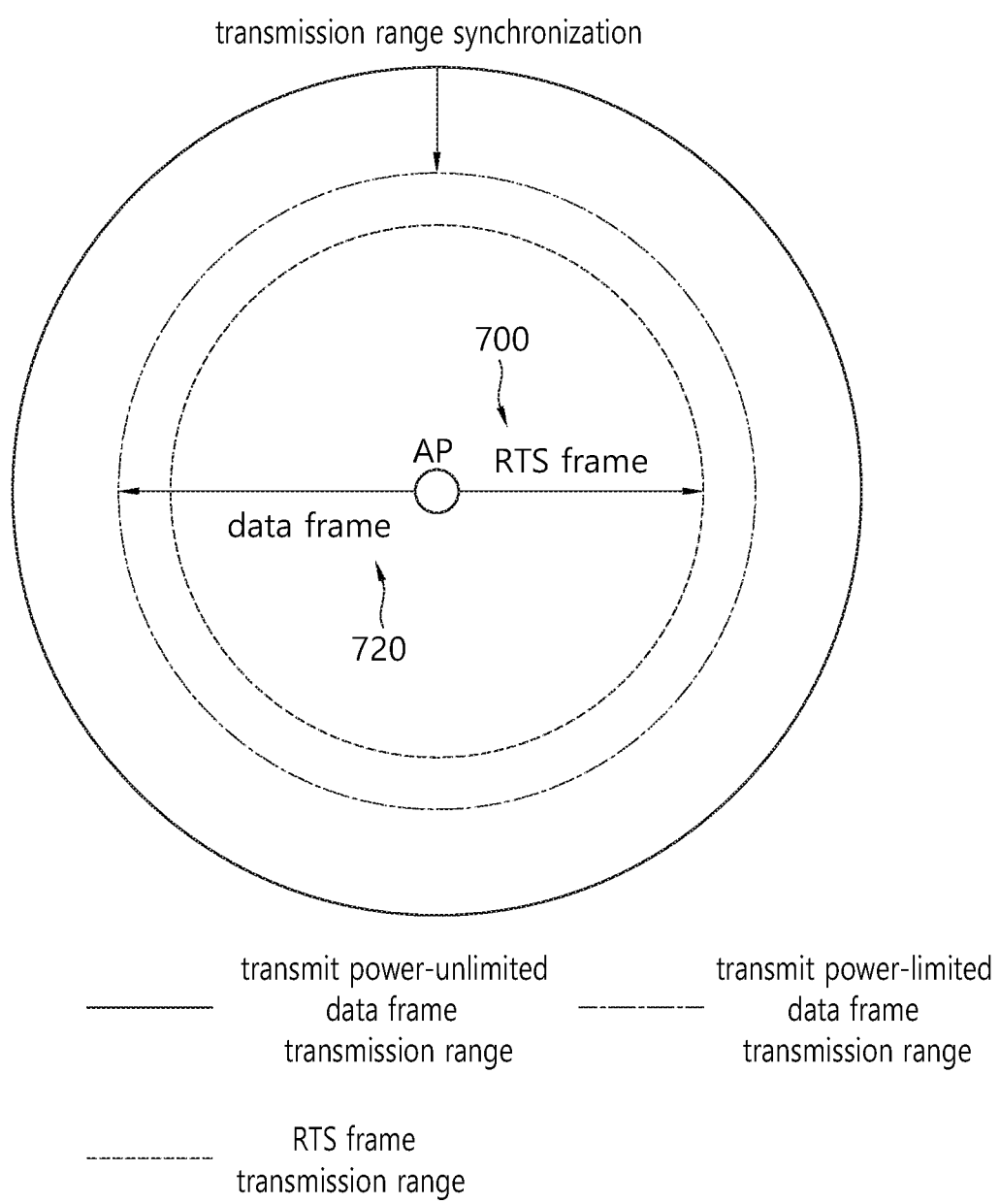
FIG. 7 is a conceptual view illustrating a transmit power-based transmission range synchronization method according to an embodiment of the present invention.

FIG. 7 is a conceptual view illustrating a transmit power-based transmission range synchronization method according to an embodiment of the present invention.

FIG. 7 illustrates a method of synchronizing transmission ranges of an RTS frame 700 and a CTS frame as legacy frames and a transmission range of a data frame 720 as an HE frame by setting transmit power for transmitting a legacy PPDU (or legacy frame) to be different from transmit power for transmitting an HE PPDU (or HE frame). Hereinafter, transmit power for transmitting the RTS frame 700 may be referred to as RTS transmit power, and transmit power for transmitting the data frame 720 may be referred to as data transmit power.

An AP may determine the RTS transmit power and the data transmit power based on a power control method.

For example, when the RTS transmit power is 30 dBm, the data transmit power may be set to a value lower than 30 dBm. When the data transmit power is set to a value lower than the RTS transmit power, if considering only the transmit powers, the transmission range of the data frame may be relatively smaller than the transmission range of the RTS frame.

The RTS transmit power and the data transmit power may be set to be different considering a transmission range difference. For example, when a transmission range difference is 3 (dB) due to an IFFT size difference and the RTS transmit power is set to 30 dBm, the data transmit power may be set to 27 dBm. A difference between the RTS transmit power and the data transmit power may change according to a transmission range difference.

Although restriction on transmit power may lead to a decrease in the transmission range of the data frame 720, when transmit power is reduced, interference in a neighboring BSS may be reduced. Thus, restriction on transmit power may result in improvement in overall system performance.

The transmit power-based transmission range synchronization method may be applied to a legacy frame (legacy PPDU) and an HE frame (HE PPDU), in which case transmit power for transmitting a legacy frame may be referred to as legacy transmit power and transmit power for transmitting an HE frame may be referred to as HE transmit power.

Transmit power for the CTS frame as well as for the RTS frame 700 may be set to be equal to the RTS transmit power. Further, a transmission range difference may change according to an increased IFFT size (125 IFFT, 256 IFFT, 512 IFFT, or 1024 IFFT), and a transmit power difference (a difference between the RTS transmit power and the data transmit power) may change according to a transmission range difference. A transmit power difference is defined for use according to an increased IFFT size in the WLAN system.

The MCS-, CCA threshold-, and transmit power-based transmission range synchronization methods illustrated in FIGS. 5 to 7 may be used separately or be used in combination. For example, transmission range synchronization may be performed by controlling at least two elements of an MCS, a CCA threshold, and transmit power. A parameter determining a transmission range, such as an MCS, a CCA threshold, or transmit power, may be referred to as a transmission range determination parameter.

Specifically, an AP may transmit an RTS frame for medium protection to an STA and may receive a CTS frame from the STA in response to the RTS frame. Further, the AP may transmit a data frame to the STA in response to the CTS frame. Here, the RTS frame may be included in a first PPDU that is generated on the basis of a first IFFT size, the data frame may be included in a second PPDU that is generated on the basis of a second IFFT size. The second IFFT size may be greater than the first IFFT size, and the data frame may be transmitted on the basis of a transmission range determination parameter that is determined on the basis of a difference between the second IFFT size and the first IFFT size.

The transmission range determination parameter may include a first MCS index for modulating and coding the data frame. The first MCS index may be greater than a second MCS index for modulating and coding the RTS frame.

The transmission range determination parameter may include a first CCA threshold for receiving the data frame. The first CCA threshold may be greater than a second CCA threshold for receiving the RTS frame.

The transmission range determination parameter may include a first transmit power for transmitting the data frame. The first transmit power may be smaller than a second transmit power for transmitting the RTS frame.

Although it is assumed that the data frame is transmitted on the basis of the transmission range determination parameter, the RTS frame may be transmitted on the basis of the transmission range determination parameter (the second MCS index, the second CCA threshold, and the second transmit power).

Figure 8:
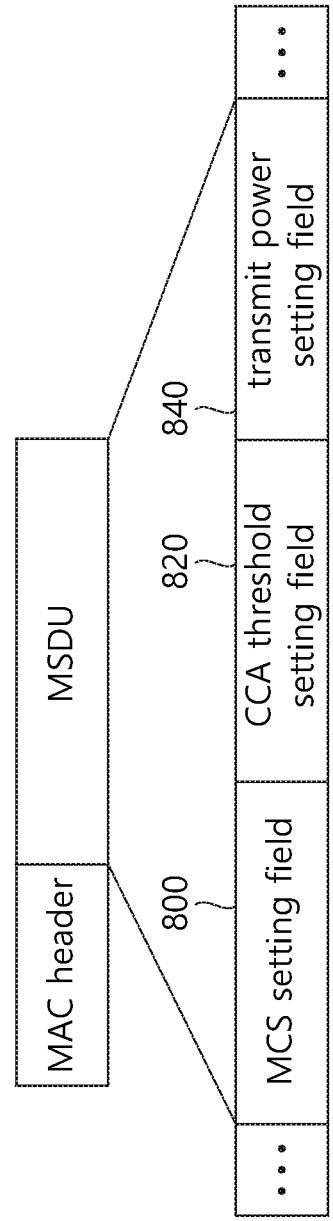
FIG. 8 is a conceptual view illustrating a frame for transmission range synchronization according to an embodiment of the present invention.

FIG. 8 is a conceptual view illustrating a frame for transmission range synchronization according to an embodiment of the present invention.

FIG. 8 illustrates a frame including information on an MCS index, a CCA threshold, or transmit power for transmission range synchronization illustrated in FIGS. 5 to 7. The frame including the information for transmission range synchronization may be referred to as a transmission range synchronization frame.

For convenience of description, FIG. 8 illustrates a transmission range synchronization frame that includes information on all of an MCS index, a CCA threshold, and transmit power. However, a transmission range synchronization frame may include information on only at least one of an MCS index, a CCA threshold, and transmit power as the information for transmission range synchronization. For example, a transmission range synchronization frame may include information on a CCA threshold only, and an STA receiving the information on the CCA threshold through the transmission range synchronization frame may set different CCA thresholds for receiving an RTS frame and for receiving a data frame based on the CCA threshold.

Referring to FIG. 8, an AP may transmit, to an STA, a transmission range synchronization frame including information for synchronizing transmission ranges of a legacy frame (for example, an RTS frame/CTS frame) and an HE frame (for example, a data frame.

The information for synchronizing the transmission ranges included in the transmission range synchronization frame may include an MCS setting field, a CCA threshold setting field, and a transmit power setting field.

The MCS setting field 800 may include information on an MCS index for an RTS frame (for example, a legacy frame) and/or information on an MCS index for a data frame (for example, an HE frame). When the STA, which receives the MCS setting field 800 through the transmission range synchronization frame, receives a data frame, the STA may determine an MCS index used to transmit the data frame excluding certain MCS indexes. Subsequently, when transmitting the CTS frame or data frame, the STA, which receives the MCS setting field 800 through the transmission range synchronization frame, may transmit a CTS frame or data frame in view of the MCS indexes included in the MCS setting field 800.

The CCA threshold setting field 820 may include information on a CCA threshold for an RTS frame (for example, a legacy frame) and/or information on a CCA threshold for a data frame (for example, an HE frame).

The transmit power setting field 840 may include information on transmit power for an RTS frame (for example, a legacy frame) and/or information on transmit power for a data frame (for example, an HE frame). Subsequently, when transmitting the CTS frame or data frame, the STA, which receives the transmit power setting field 840 through the transmission range synchronization frame, may transmit a CTS frame or data frame in view of transmit power information included in the transmit power setting field.

The STA may receive the transmission range synchronization frame from the AP and may set a CCA threshold. Alternatively, the STA may determine an MCS index and transmit power for a CTS frame to transmit to the AP based on the transmission range synchronization frame.

That is, the AP may transmit the transmission range synchronization frame on the basis of broadcast, and the transmission range synchronization frame may include a transmission range determination parameter (MCS index, CCA threshold, transmit power, or the like). The transmission range synchronization frame may be a newly defined frame or may be a beacon frame periodically transmitted by the AP.

Although FIG. 8 illustrates that the information for transmission range synchronization is included in a medium access control (MAC) service data unit (MSDU), the information for transmission range synchronization may also be included in an MAC header or PPDU header (PHY header and/or PHY preamble).

Although FIGS. 4 to 8 illustrate that the AP transmits an RTS frame and a data frame, the embodiments illustrated in FIGS. 4 to 8 may also be applied to a case where the STA transmits an RTS frame and a data frame. Further, although FIGS. 4 to 8 illustrate a PPDU generated based on an IFFT, a PPDU may also be generated based on an inverse discrete Fourier transform (IDFT), instead of an IFFT.

Figure 9:
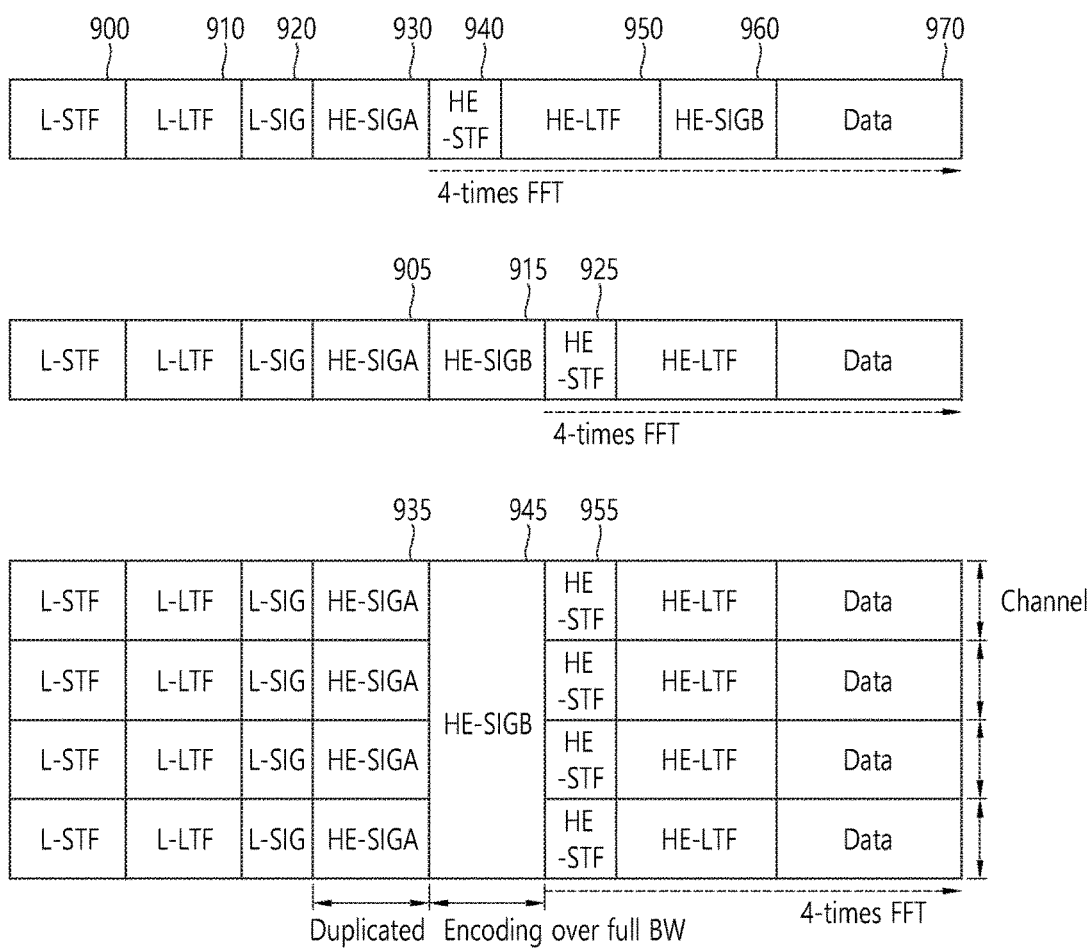
FIG. 9 is a conceptual view illustrating an HE PPDU format according to an embodiment of the present invention.

FIG. 9 is a conceptual view illustrating an HE PPDU format according to an embodiment of the present invention.

FIG. 9 illustrates the HE PPDU format according to the embodiment of the present invention.

The HE PPDU format may be used to transmit an HE frame, such as a data frame.

Referring to the upper part of FIG. 9, a PHY header of a downlink PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal-B (HE-SIG B). The PHY header may be divided into a legacy part to the L-SIG and an HE part after the L-SIG.

The L-STF 900 may include a short training orthogonal frequency division multiplexing (OFDM) symbol. The L-STF 900 may be used for frame detection, automatic gain control (AGC), diversity detection, and coarse frequency/time synchronization.

The L-LTF 910 may include a long training OFDM symbol. The L-LTF 910 may be used for fine frequency/time synchronization and channel estimation.

The L-SIG 920 may be used to transmit control information. The L-SIG 920 may include information on data rate and data length.

The HE-SIG A 930 may include information to indicate a STA to receive the PPDU. For example, the HE-SIG A 930 may include an identifier of a specific STA (or AP) to receive the PPDU and information to indicate a group of the specific STA. Further, when the PPDU is transmitted based on OFDMA or MIMO, the HE-SIG A 930 may include resource allocation information on the STA.

In addition, the HE-SIG A 930 may also include color bits information for BSS ID information, bandwidth information, a tail bit, a CRC bit, MCS information on the HE-SIG B 960, symbol number information for the HE-SIG B 960, and cyclic prefix (CP or guard interval (GI)) length information.

The HE-STF 940 may be used to improve automatic gain control estimation in an MIMO environment or OFDMA environment.

The HE-LTF 950 may be used to estimate a channel in the MIMO environment or OFDMA environment.

The HE-SIG B 960 may include information on physical layer service data unit (PSDU) length and an MCS for each STA, tail bits, and the like. Further, the HE-SIG B 960 may include information on an STA to receive the PPDU and OFDMA-based resource allocation information (or MU-MIMO information). When the OFDMA-based resource allocation information (or MU-MIMO information) is included in the HE-SIG B 960, the HE-SIG A 930 may not include resource allocation information.

An IFFT applied to the HE-STF 940 and fields after the HE-STF 940 may have a different size from an IFFT applied to fields before the HE-STF 940. For example, the IFFT applied to the HE-STF 940 and the fields after the HE-STF 940 may have a size four times larger than that applied to the fields before the HE-STF 940. An STA may receive the HE-SIG A 930 and may be instructed to receive the downlink PPDU based on the HE-SIG A 930. In this case, the STA may decode the HE-STF 940 and the fields after the HE-STF 940 based on an FFT with a modified size. On the contrary, when the STA is not instructed to receive the downlink PPDU based on the HE-SIG A 930, the STA may stop decoding and may set an NAV. A cyclic prefix (CP) of the HE-STF 940 may have a larger size than CPs of other fields, and the STA may decode the downlink PPDU by changing the FFT size during CP duration.

The fields of the PPDU format illustrated in the upper part of FIG. 9 may be configured in a different order. For example, as illustrated in the middle part of FIG. 9, the HE-SIG B 915 of the HE part may be positioned immediately after the HE-SIG A 905. The STA may decode up to the HE-SIG A 905 and the HE-SIG B 915, may receive necessary control information, and may set an NAV. Likewise, an IFFT applied to the HE-STF 925 and fields after the HE-STF 925 may have a different size from an IFFT applied to fields before the HE-STF 925.

The STA may receive the HE-SIG A 905 and the HE-SIG B 915. When the STA is instructed to receive the PPDU based on the HE-SIG A 905, the STA may decode the PPDU by changing an FFT size from the HE-STF 925. On the contrary, when the STA receives the HE-SIG A 905 and is not instructed to receive the downlink PPDU based on the HE-SIG A 905, the STA may set an NAV.

The lower part of FIG. 9 illustrates a PPDU format for DL MU OFDMA transmission. According to the embodiment of the present invention, the AP may transmit downlink frames or downlink PPDUs to a plurality of STAs using the PPDU format for DL MU OFDMA transmission. The respective downlink PPDUs may be transmitted to the STAs through different transmission resources (frequency resources or spatial streams). Fields before the HE-SIG B 945 in the PPDU may be transmitted in a duplicated form through different transmission resources. The HE-SIG B 945 may be transmitted in an encoded form on all transmission resources. Fields after the HE-SIG B 945 may include individual information for each of the plurality of STAs receiving the PPDUs.

For example, the HE-SIG A 935 may include ID information on a plurality of STAs to receive downlink data and information on a channel used to transmit the downlink data to the plurality of STAs.

When the fields included in the PPDU are transmitted through respective transmission resources, CRCs for the respective fields may be included in the PPDU. However, when a particular field in the PPDU is transmitted in the encoded form on all transmission resources, the CRCs for the respective fields may not be included in the PPDU. Accordingly, CRC overhead may be reduced.

Likewise, in the PPDU format for DL MU transmission, the HE-STF 955 and fields after the HE-STF 955 may also be encoded based on a different IFFT size from that for fields before the HE-STF 955. Thus, when the STA receives the HE-SIG A 935 and the HE-SIG B 945 and is instructed to receive the PPDU based on the HE-SIG A 935, the STA may decode the PPDU by changing an FFT size from the HE-STF 955.

Figure 10:
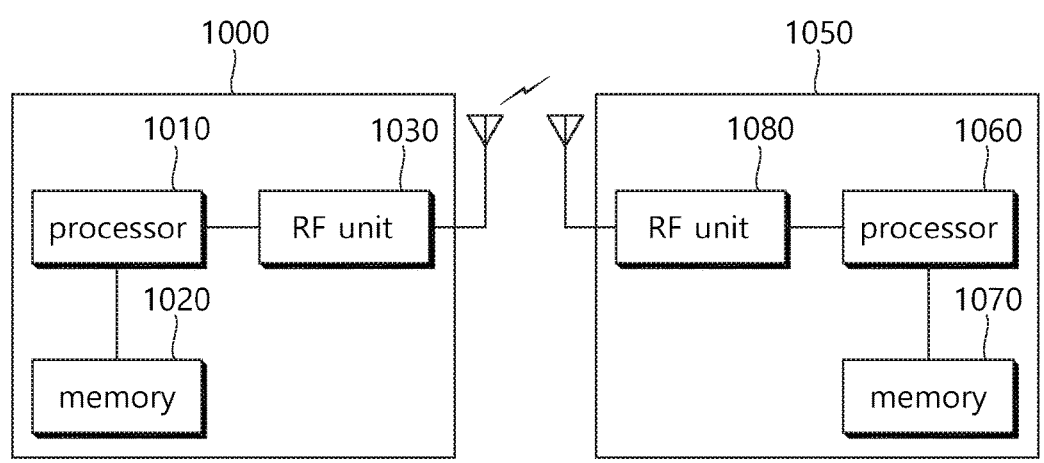
FIG. 10 is a block diagram illustrating a wireless device according to an embodiment of the present invention.

FIG. 10 is a block diagram illustrating a wireless device according to an embodiment of the present invention.

Referring to FIG. 10, the wireless device 1000 may be an STA capable of implementing the foregoing embodiments, which may be an AP 1000 or a non-AP STA (or STA) 1050.

The AP 1000 includes a processor 1010, a memory 1020, and a radio frequency (RF) unit 1030.

The RF unit 1030 may be connected to the processor 1010 to transmit/receive a radio signal.

The processor 1010 may implement functions, processes and/or methods suggested in the present invention. For example, the processor 1010 may be configured to perform operations of the AP according to the foregoing embodiments of the present invention. The processor may perform the operations of the AP illustrated in the embodiments of FIGS. 1 to 9.

For example, the processor 1010 may be configured to transmit an RTS frame for medium protection to an STA, to receive a CTS frame from the STA in response to the RTS frame, and to transmit a data frame to the STA in response to the CTS frame The RTS frame may be include in a first PPDU that is generated on the basis of a first IFFT size, the data frame may be include in a second PPDU that is generated on the basis of a second IFFT size, and the second IFFT size may be greater than the first IFFT size. The data frame may be transmitted on the basis of a transmission range determination parameter that is determined on the basis of a difference between the second IFFT size and the first IFFT size.

The STA 1050 includes a processor 1060, a memory 1070, and an RF unit 1080.

The RF unit 1080 may be connected to the processor 1060 to transmit/receive a radio signal.

The processor 1060 may implement functions, processes and/or methods suggested in the present invention. For example, the processor 1060 may be configured to perform operations of the STA according to the foregoing embodiments of the present invention. The processor may perform the operations of the STA illustrated in the embodiments of FIGS. 1 to 9.

For example, the processor 1060 may be configured to receive a CCA threshold for receiving a data frame and a CCA threshold for an RTS frame and to detect the data frame and the RTS frame. Further, the processor 1060 may be configured to transmit a CTS frame with the same MCS index and transmit power as those for the RTS frame. When the STA transmits the RTS frame and the data frame, the processor 1060 may perform the same operations as those of the processor 1010.

The processors 1010 and 1060 may include an application-specific integrated circuit (ASIC), other chipsets, a logic circuit, a data processor and/or a converter to convert a baseband signal and a radio signal from one to the other. The memories 1020 and 1070 may include a read-only memory (ROM), a random access memory (RAM), a flash memory, a memory card, a storage medium and/or other storage devices. The RF units 1030 and 1080 may include at least one antenna to transmit and/or receive a radio signal.

When the embodiments are implemented with software, the foregoing techniques may be implemented by a module (process, function, or the like) for performing the foregoing functions. The module may be stored in the memories 1020 and 1070 and be executed by the processors 1010 and 1060. The memories 1020 and 1070 may be disposed inside or outside the processors 1010 and 1060 or be connected to the processors 1010 and 1060 via various well-known means.

What is claimed is:

1. A method of transmitting a frame in a wireless local area network (WLAN), the method comprising:
   transmitting, by an access point (AP), a Request to Send (RTS) frame for medium protection to a station (STA);
   receiving, by the AP, a Clear to Send (CTS) frame from the STA in response to the RTS frame; and
   transmitting, by the AP, a data frame to the STA in response to the CTS frame,
   wherein the RTS frame is comprised in a first physical layer convergence procedure (PLCP) protocol data unit (PPDU) that is generated on the basis of a first inverse fast Fourier transform (IFFT) size, the data frame is comprised in a second PPDU that is generated on the basis of a second IFFT size, the second IFFT size is greater than the first IFFT size, and the data frame is transmitted on the basis of a transmission range determination parameter that is determined on the basis of a difference between the second IFFT size and the first IFFT size.

2. The method of claim 1, wherein the transmission range determination parameter comprises a first modulation and coding scheme (MCS) index for modulating and coding the data frame, and the first MCS index is greater than a second MCS index for modulating and coding the RTS frame.

3. The method of claim 1, wherein the transmission range determination parameter comprises a first clear channel assessment (CCA) threshold for receiving the data frame, and the first CCA threshold is greater than a second CCA threshold for receiving the RTS frame.

4. The method of claim 1, wherein the transmission range determination parameter comprises a first transmit power for transmitting the data frame, and the first transmit power is smaller than a second transmit power for transmitting the RTS frame.

5. The method of claim 1, further comprising transmitting, by the AP, a transmission range synchronization frame on the basis of broadcast, wherein the transmission range synchronization frame comprises the transmission range determination parameter, the transmission range determination parameter comprises a CCA threshold setting field, and the CCA threshold setting field comprises information on a first CCA threshold for receiving the RTS frame and information on a second CCA threshold for receiving the data frame.

6. An access point (AP) for transmitting a frame in a wireless local area network (WLAN), the AP comprising:
   a radio frequency (RF) unit configured to transmit or receive a radio signal; and
   a processor operatively connected to the RF unit,
   wherein the processor is configured to transmit a Request to Send (RTS) frame for medium protection to a station (STA), to receive a Clear to Send (CTS) frame from the STA in response to the RTS frame, and to transmit a data frame to the STA in response to the CTS frame, the RTS frame is comprised in a first physical layer convergence procedure (PLCP) protocol data unit (PPDU) that is generated on the basis of a first inverse fast Fourier transform (IFFT) size, the data frame is comprised in a second PPDU that is generated on the basis of a second IFFT size, the second IFFT size is greater than the first IFFT size, and the data frame is transmitted on the basis of a transmission range determination parameter that is determined on the basis of a difference between the second IFFT size and the first IFFT size.

7. The AP of claim 6, wherein the transmission range determination parameter comprises a first modulation and coding scheme (MCS) index for modulating and coding the data frame, and the first MCS index is greater than a second MCS index for modulating and coding the RTS frame.

8. The AP of claim 6, wherein the transmission range determination parameter comprises a first clear channel assessment (CCA) threshold for receiving the data frame, and the first CCA threshold is greater than a second CCA threshold for receiving the RTS frame.

9. The AP of claim 6, wherein the transmission range determination parameter comprises a first transmit power for transmitting the data frame, and the first transmit power is smaller than a second transmit power for transmitting the RTS frame.

10. The AP of claim 6, wherein the processor is configured to transmit a transmission range synchronization frame on the basis of broadcast, the transmission range synchronization frame comprises the transmission range determination parameter, the transmission range determination parameter comprises a CCA threshold setting field, and the CCA threshold setting field comprises information on a first CCA threshold for receiving the RTS frame and information on a second CCA threshold for receiving the data frame.

* * * * *